Dec. 23, 1952  J. R. STIRNKORB  2,622,409
ULTRAVIOLET LIGHT SOURCE AND CIRCUITS
FOR REFRIGERATOR CABINETS
Filed July 26, 1946
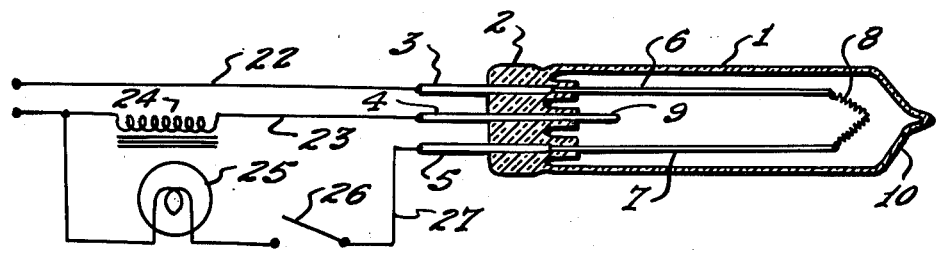
FIG.1.
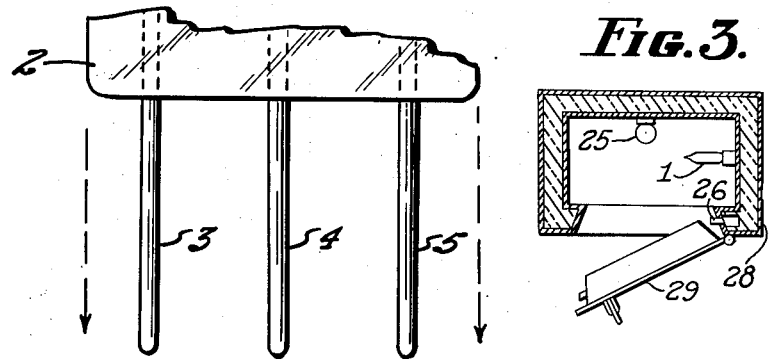
FIG.3.
FIG.2.
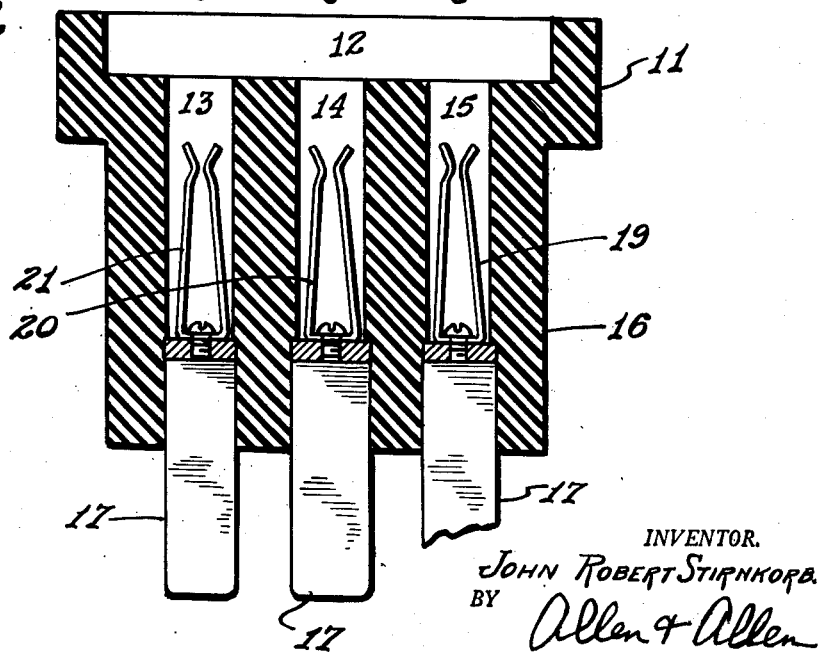
INVENTOR.
JOHN ROBERT STIRNKORB.
BY Allen & Allen
ATTORNEYS.

Patented Dec. 23, 1952

2,622,409

UNITED STATES PATENT OFFICE 2,622,409

ULTRAVIOLET LIGHT SOURCE AND CIRCUIT FOR REFRIGERATOR CABINETS

John Robert Stirnkorb, Cincinnati, Ohio, assignor to Institutum Divi Thomae Foundation, Cincinnati, Ohio, a corporation of Ohio Application July 26, 1946, Serial No. 686,344

2 Claims. (Cl. 62—89)

1

The principal objects of this invention are the provision of a novel ultra-violet lamp whereby substantial economies in construction, installation and operation are obtained, and the provision of a novel circuit whereby, under certain circumstances of use, still further economies are obtained.

While this particular field of utility is not a limitation on the invention, my structures were designed especially for the provision of irradiation in restricted, refrigerated spaces, such as the household refrigerator. Here, it has long been realized that a degree of ultra-violet radiation is highly useful in sterilizing the enclosed air, and in minimizing the activity of bacteria and moulds on the surfaces of stored articles. Since the radiation is intended to be continuous during the use of the refrigerator, it will be of the low power or low intensity type.

Hitherto, the provision or irradiation in domestic refrigerators has involved substantial installation and operating expense. Moreover, it has involved some uncertainty, in that, unless the irradiating means was clearly visible or is used for illumination as well, there was no positive indication of its operation or operability, and it was readily possible for the irradiating means to become and remain inoperative without the owner realizing it.

It is an object of my invention to provide an ultra-violet light source of very inexpensive character which can be easily and cheaply installed either in new equipment or old, and which can be easily and inexpensively exchanged if it becomes inoperative.

It is an object of my invention to provide a source which is cheap to operate and has a very low current consumption.

In the provision of circuit means for use with the source, it is my object to utilize circuit elements already present in standard structures as parts of the required assembly, whereby additional economies are effected; and it is an object of my invention in this connection to provide means which will give a definite indication of the integrity of an ionizing filament in the ultra-violet light source.

It is also an object to provide for the automatic starting of the light source and the restarting thereof if the source becomes extinguished.

These and other objects of the invention which will be made clear as the description proceeds, or will be apparent to one skilled in the art upon reading these specifications, I accomplish by that construction and arrangement of parts of which I shall now describe an exemplary embodiment. Reference is made to the accompanying drawings, wherein:

Figure 1 is a sectional view showing my novel source of ultra-violet radiations, together with a diagrammatic representation of an appropriate circuit for household refrigerator use.

Figure 2 is a sectional view on an enlarged scale of socket means which I may employ with my light source.

Figure 3 is a plan view with parts in section of my invention incorporated in a household refrigerator.

My ultra-violet light source is exceptionally simple in construction. It comprises an elongated, tubular, vitreous envelope 1, pervious to ultraviolet light. There is a press 2 at one end of the envelope; and through this press pass three leads 3, 4, and 5. Two of these leads are prolonged as at 6 and 7 to a position adjacent the other end of the envelope, where they are connected together by a filament 8. The other lead terminates within the envelope adjacent the press in a stub 9 of nickel or other suitable anode metal.

The filament 8 is a coiled filament of tungsten or the like, coated with an electron-emissive oxide. The filament itself is also bodily coiled or looped so as to provide for the striking of a trigger arc upon initial ionization.

At the filament end of the envelope, a tip 10 indicates the sealing-off of an exhaust and gassing tube originally forming part of the envelope at this position. The lead wires 3, 4, and 5, are heavy enough to have substantial stiffness and extend about a half inch, more or less, beyond the press 2.

My lamps for most uses are small, say three and one-half to five and one-half inches in length and one-half to three-fourths inches in diameter. Hence, the press 2 can be formed directly in the envelope. The tube has no built-on base. The leads 6 and 7 within the tube are not insulated. The fact that the filament is mounted at a position remote from the press prevents damage to the filament during manufacture. The lamp has only three contact members, all located at one end, as distinguished from the four contact members located in pairs at the two ends of conventional hot cathodes ultra-violet sources. The envelope is processed and preferably contains some argon or other noble gas, the gas pressure being low. The tube also contains some mercury or other vaporizable metal which assists in the production of a desired radiation spectrum. Leads 3, 4, and 5 may be engaged in a type of socket similar to those employed with radio tubes, and the lightness of the entire lamp structure is such that it may be supported in any desired position by such engagement of these leads.

In Figure 2, I have shown a type of socket of receptacle designed for panel mounting for accepting my lamp and capable of being inserted by means of its prongs into a socket. It comprises an insulated body 11 having a recess 12 to accept the press 2 or a portion thereof, and depending recesses 13, 14, and 15 to accept the leads 3, 4, and 5. There is a cylindrical portion 16, and three terminal prongs 17. These last three prongs are connected respectively to slips 19, 20, and 21 in the depending recesses for engaging the lamp leads. It will be understood that this socket or receptacle is not a part of the lamp, but that lamps may be plugged into position on it as required by the exigencies of service. If desired a threaded receptacle could be used with the terminals in the plug connected to the threaded shell, a terminal tip, (as in the usual threaded socket type). The third terminal could be connected to a ring separated from the tip.

In the operation of my lamps, the stub 9 serves as one of the arc electrodes, the filament 8 being the other. Hence, the lead 4 and one of the outer leads, 3 or 5, are connected to a power supply containing a suitable ballast impedance for the arc. The other of the leads 3 or 4 is connected to a starting circuit for the lamp. When the starting circuit is completed, by switch 26 the filament 8 will be energized and the electron-emissive substance on its surface will give off electrons to ionize the surrounding atmosphere. Presently, due to the voltage drop across the filament a supplementary or trigger arc will be struck between the filament portions. This will enhance the process of ionization and presently the atmosphere within the envelope will be sufficiently ionized to permit the striking of an arc between the filament 8 and the stub 9.

By reason of its construction, my lamp produces an arc discharge on one half only of the alternating current cycle. The action of the arc keeps the filament in heated condition irrespective of the breaking of the starting circuit. The arc will be struck between the filament and the stub, but not in the reverse direction. For this reason, it is not necessary that the leads 6 and 7 be insulated. Lamps of the sizes referred to above operate, with suitable ballasts, at wattages in the neighborhood of two watts. They give off relatively low intensity ultra-violet radiation which will not produce deleterious effects in irradiated substances, but at the same time will serve to produce substantial sterilization of the air within a closed space such as a domestic refrigerator and will keep down the activity of bacteria and moulds.

I have further devised a circuit for operating my lamps which uses circuit elements already present as standard equipment in most modern refrigerators. It is common practice to provide these devices with an illuminating lamp and a door switch operating to turn on the lamp only when the door is opened. In the circuit, diagrammed in Figure 1, it will be seen that I have connected the leads 3 and 4, respectively, to the lines 22 and 23 of a power circuit. The latter line contains a controlling impedance 24 for the arc, which may be an inductance, or a resistance.

Element 25 is the incandescent lamp employed for illumination inside the refrigerator, and 26 is the standard door switch employed to control the incandescent lamp 25. These elements are connected in series in the line 27 of a starting circuit which is connected to lead 5 of the lamp and is connected to power line 23 on the power source side of the impedance 24. It will be noted that when the switch 26 is closed, the incandescent lamp 25 is in series with the filament 8 of my ultra-violet lamp. It is clear that the rated voltage of the incandescent lamp 25 may be chosen at such value as to give the desired degree of illumination within the refrigerator when the lamp 25 is in series with the filament 8, and by the same token, the incandescent lamp 25 acts to limit the voltage drop across the filament 8 of my ultra-violet lamp, enabling me to employ short, low voltage filaments.

In Figure 3, I have shown a refrigerator cabinet 28 having a door 29, with the door switch 26 positioned to be opened and closed as the door 29 is opened and closed. The switch is such that it will be closed when the door 29 is opened, as illustrated in Figure 3, and opened when the door is closed.

When the door switch 26 is closed, the starting of my lamp proceeds as has been described above. The starting circuit is opened when the closing of the refrigerator door opens the switch 26. After my ultra-violet lamp has been started in this fashion, further operation of the door or door switch will not greatly affect the operation of my ultra-violet lamp. Nevertheless, if there should be a current interruption, or if the arc discharge should be extinguished for any other reason, my lamp will be re-started when the refrigerator door is again opened.

The efficiency of my ultra-violet lamp is high because of the relatively long arc and because no current is wasted in heating the filament, excepting when the refrigerator door is opened. The cost of my lamp is low because of the extreme simplicity of its construction. Its operational cost is low because of its low current consumption. Its installation cost is low because of the use of a number of parts already forming standard construction in refrigerators as made and marketed. My lamps can be readily replaced as will be evident.

I am currently manufacturing my ultra-violet lamps to operate on 110 or 220 volts; and it is an advantage of their construction that they will operate either on alternating current or on direct current.

I am not limited, however, in the use of my lamps to the particular starting and operating circuits illustrated in Figure 1. My lamps can be started with simple hand switches in place of the door switch 26, or they can be started by any of the standard type of starting switches for fluorescent lamps. For example, I may employ a thermostatic switch for the starting circuit which will automatically open the starting circuit after a predetermined interval, the thermostatic switch being also associated with the arc power circuit in such a way as to be kept open so long as the arc is in operation.

Modifications may be made in my invention without departing from the spirit of it. Having thus described my invention in an exemplary embodiment, what I claim as new and desire to secure by Letters Patent is:

1. In a treatment apparatus including a cabinet having a door, an incandescent bulb for furnishing illumination within said cabinet, a door switch for turning said bulb off and on, said switch being in the on position when said door is opened, an ultraviolet light source comprising an envelope having three leads passing through a single press, a filament coated with electron-emissive substance and serving as a cathode, two of said leads connected to said filament so as to permit application of energizing current thereto from a starting circuit including both of said leads, an anode, a third of said leads connected to said anode, a power circuit including lines, one of said filament leads being connected to one of said lines, the other of said filament leads being connected to the other of said lines through said door switch and said incandescent bulb in series, and said anode lead being connected to the said other line through an arc ballast impedance.

2. The structure claimed in claim 1 wherein said cabinet is a domestic refrigerator.

JOHN ROBERT STIRNKORB.

REFERENCES CITED

The following references are of record in the file of this patent:

UNITED STATES PATENTS

| Number | Name | Date |
|---|---|---|
| 2,016,437 | Jones | Oct. 8, 1935 |
| 2,153,009 | Scott | Apr. 4, 1939 |
| 2,162,546 | Breadner | June 13, 1939 |
| 2,181,305 | Myers | Nov. 28, 1939 |
| 2,215,123 | Kalischer | Sept. 17, 1940 |
| 2,245,837 | Stoddard | June 17, 1941 |
| 2,322,421 | Cox | June 22, 1943 |
| 2,331,881 | Abadie | Oct. 19, 1943 |
| 2,339,051 | Cates | Jan. 11, 1944 |
| 2,339,085 | Luckiesh | Jan. 11, 1944 |
| 2,341,990 | Inman | Feb. 15, 1944 |
| 2,448,937 | Walter | Sept. 7, 1948 |